US 9,980,243 B2

(12) United States Patent
Zhang et al.

(10) Patent No.: US 9,980,243 B2
(45) Date of Patent: May 22, 2018

(54) METHODS AND APPARATUS FOR WIRELESS DEVICE SYNCHRONIZATION

(71) Applicant: Nokia Technologies Oy, Espoo (FI)

(72) Inventors: Zhi Zhang, Beijing (CN); Juha Sakari Korhonen, Espoo (FI); Kodo Shu, Shanghai (CN); Yixue Lei, Beijing (CN); Zexian Li, Espoo (FI); Klaus Hugl, Vienna (AT)

(73) Assignee: Nokia Technologies Oy, Espoo (FI)

( * ) Notice: Subject to any disclaimer, the term of this patent is extended or adjusted under 35 U.S.C. 154(b) by 73 days.

(21) Appl. No.: 15/022,351

(22) PCT Filed: Sep. 27, 2013

(86) PCT No.: PCT/CN2013/084456
§ 371 (c)(1),
(2) Date: Mar. 16, 2016

(87) PCT Pub. No.: WO2015/042872
PCT Pub. Date: Apr. 2, 2015

(65) Prior Publication Data
US 2016/0234801 A1 Aug. 11, 2016

(51) Int. Cl.
*H04W 56/00* (2009.01)
(52) U.S. Cl.
CPC ..... *H04W 56/0015* (2013.01); *H04W 56/002* (2013.01); *H04W 56/0005* (2013.01); *H04W 56/0025* (2013.01)
(58) Field of Classification Search
None
See application file for complete search history.

(56) References Cited

U.S. PATENT DOCUMENTS 5,977,881 A * 11/1999 Kido ................. H04W 52/0241
340/7.27
2009/0116430 A1* 5/2009 Bonta ................... H04W 84/18
370/329
(Continued)

FOREIGN PATENT DOCUMENTS

CN  102065032 A  5/2011
EP  2131511 A2  12/2009
(Continued)

OTHER PUBLICATIONS

"Device Discovery Outside and Partial Network Coverage", 3GPP TSG-RAN Working Group 1 meeting #73, R1-132249, Agenda: 6.2.7.3, LG Electronics, May 20-24, 2013, pp. 1-3.
(Continued)

*Primary Examiner* — Anh Ngoc Nguyen
(74) *Attorney, Agent, or Firm* — Harrington & Smith

(57) ABSTRACT

Systems and techniques for synchronization between in-coverage and out-of coverage user devices. A base station configures in-coverage and out-of coverage synchronization signals and configures user devices to recognize synchronization signals as in-coverage or out-of-coverage. An in-coverage device furnishes an in-coverage synchronization signal upon detection of an out-of coverage signal, and may continue to furnish the signal upon continued detection of an out-of-coverage signal that is not synchronized to the network. An out-of-coverage device may receive and synchronize to an in-coverage signal if available, or an out-of-coverage signal if available, or may generate and transmit its own out-of-coverage signal if no in-coverage or out-of-coverage signal is available. Signals may include rank information to indicate relay sequence information, and user devices may be configured to respond to signals based on the rank information—such as favoring a signal whose rank
(Continued)

indicates that the signal represents a lower relay order number.

13 Claims, 4 Drawing Sheets

(56) References Cited

U.S. PATENT DOCUMENTS

2010/0135176 A1* 6/2010 Kazmi ................. H04W 24/08
370/252
2016/0198289 A1* 7/2016 Sorrentino ............ H04W 4/005
455/41.2

FOREIGN PATENT DOCUMENTS

| WO | 2011/097770 | A1 | 8/2011 |
| WO | 2012/100200 | A2 | 7/2012 |
| WO | 2013010418 | A1 | 1/2013 |
| WO | 2013/042954 | A1 | 3/2013 |

OTHER PUBLICATIONS

"Introduction of Prose", 3GPP TSG-RAN meeting #88, R2-145302, Samsung, Nov. 17-21, 2014, 71 Pages.
"Inclusion of Prose", 3GPP TSG-RAN WG 1 meeting #79, R1-145489, Ericsson, Nov. 17-21, 2014, 126 Pages.
"Way Forward on D2D Synchronization", 3GPP TSG-RAN Working Group 1 meeting #76, R1-140937, Agenda: 7.2.8.1.1, Huawei, Feb. 10-14, 2014, 2 Pages.
"3rd Generation Partnership Project; Technical Specification Group Radio Access Network; Evolved Universal Terrestrial Radio Access (E-UTRA); Radio Resource Control (RRC);Protocol specification (Release 12)", 3GPP TS 36.331, V12.5.0 , Mar. 2015, pp. 1-445.
"3rd Generation Partnership Project; Technical Specification Group Radio Access Network; Evolved Universal Terrestrial Radio Access (E-UTRA); Physical channels and modulation(Release 12)", 3GPP TS 36.211, V12.5.0, Mar. 2015, pp. 1-136.
"3rd Generation Partnership Project; Technical Specification Group Radio Access Network; Evolved Universal Terrestrial Radio Access (E-UTRA); User Equipment (UE) procedures in idle mode (Release 12)", 3GPP TS 36.304, V12.4.0, Mar. 2015, pp. 1-38.
Extended European Search Report received for corresponding European Patent Application No. 13894816.1, dated Apr. 19, 2017, 6 pages.
"Techniques for Synchronization",3GPP TSG-RAN WG1 #74, R1-133598, Agenda: 7.2.8.1, Qualcomm Inc, Aug. 19-23, 2013, pp. 1-9.
International Search Report and Written Opinion received for corresponding Patent Cooperation Treaty Application No. PCT/CN2013/084456, dated Jun. 12, 2014, 14 pages.
"D2D Synchronization—Out of network coverage/partial network coverage", Nokia, NSN, 3GPP TSG-RAN WG1 Meeting #74, R1-133496, Aug. 2013, 4 pgs.
Office Action received for corresponding Japanese Patent Application No. 2016-517369, dated Apr. 28, 2017, English translation, 3 pgs.

* cited by examiner

METHODS AND APPARATUS FOR WIRELESS DEVICE SYNCHRONIZATION

RELATED APPLICATION

This application was originally filed as Patent Cooperation Treaty Application No. PCT/CN2013/084456 filed Sep. 27, 2013.

TECHNICAL FIELD

The present invention relates generally to wireless communication. More particularly, the invention relates to improved systems and techniques for synchronization between user devices within and outside of wireless network coverage.

BACKGROUND

Device to device (D2D) communication between wireless devices has gained more and more interest. In third generation partnership project (3GPP) networks, D2D devices are user devices (also referred to as user equipments or UEs) configured to be able to communicate directly with other devices without sending data through a network. A typical commercial use case could be a device receiving advertisements directly from another device. A typical public safety use case for public safety would be direct group—or unicast communication between firefighters. Some D2D UEs may communicate with a network base station, while other D2D UEs may communicate directly with other D2D devices. In some cases, some D2D UEs will be positioned outside the coverage range of a network base station, and these UEs may synchronize to D2D UEs that are within the coverage range of the network, as such D2D UEs can use a network base station as a synchronization reference.

SUMMARY

In one embodiment of the invention, an apparatus comprises at least one processor and memory storing computer program code. The memory storing the computer program code is configured to, with at least one processor, cause the apparatus to at least determine whether or not a first user device associated with the apparatus is within coverage of a network; and, if the first user device is within coverage of the network, determine if an out-of-coverage synchronization signal from an out-of-coverage user device is detected. In response to detection of an out-of-coverage synchronization signal from an out-of-coverage user device, the first user device is caused to transmit an in-coverage synchronization signal.

In another embodiment of the invention, an apparatus comprises at least one processor and memory storing computer program code. The memory storing the computer program code is configured to, with at least one processor, cause the apparatus to at least cause a base station to configure in-coverage and out-of-coverage synchronization signals and cause the base station to configure one or more user devices such that a user device outside of network coverage transmits an out-of-coverage synchronization signal and a user device inside of network coverage transmits an in-coverage synchronization only upon receiving a signal indicating that an out-of-coverage user device is within range.

In another embodiment of the invention, a method comprises determining whether or not a first user device associated with the apparatus is within coverage of a network and, if the first user device is within coverage of the network, determining if an out-of-coverage synchronization signal from an out-of-coverage user device is detected. In response to detection of an out-of-coverage synchronization signal from an out-of-coverage user device, the first user device is caused to transmit an in-coverage synchronization signal.

In another embodiment of the invention, a method comprises causing a base station to configure in-coverage and out-of-coverage synchronization signals and causing the base station to configure one or more user devices such that a user device outside of network coverage transmits an out-of-coverage synchronization signal and a user device inside of network coverage transmits an in-coverage synchronization only upon receiving a signal indicating that an out-of-coverage user device is within range.

In another embodiment of the invention, a computer readable medium stores a program of instructions, execution of which by a processor configures an apparatus to at least determine whether or not a first user device associated with the apparatus is within coverage of a network; and, if the first user device is within coverage of a network, determine if an out-of-coverage synchronization signal from an out-of-coverage user device is detected. In response to detection of an out-of-coverage synchronization signal from an out-of-coverage user device, the first user device is caused to transmit an in-coverage synchronization signal.

In another embodiment of the invention, a computer readable medium stores a program of instructions, execution of which by a processor configures an apparatus to at least cause a base station to configure in-coverage and out-of-coverage synchronization signals and cause the base station to configure one or more user devices such that a user device outside of network coverage transmits an out-of-coverage synchronization signal and a user device inside of network coverage transmits an in-coverage synchronization only upon receiving a signal indicating that an out-of-coverage user device is within range.

In another embodiment of the invention, an apparatus comprises means for determining whether or not a first user device associated with the apparatus is within coverage of a network and means for, if the first user device is within coverage of the network, determining if an out-of-coverage synchronization signal from an out-of-coverage user device is detected. In response to detection of an out-of-coverage synchronization signal from an out-of-coverage user device, the first user device is caused to transmit an in-coverage synchronization signal.

In another embodiment of the invention, an apparatus means for comprises causing a base station to configure in-coverage and out-of-coverage synchronization signals and means for causing the base station to configure one or more user devices such that a user device outside of network coverage transmits an out-of-coverage synchronization signal and a user device inside of network coverage transmits an in-coverage synchronization only upon receiving a signal indicating that an out-of-coverage user device is within range.

DETAILED DESCRIPTION

Embodiments of the present invention recognize that D2D UEs that are within network coverage are able to receive synchronization information from a base station. In some cases, however, one D2D UE may lie outside the coverage area of the network, and may depend in its synchronization information on a device within the network's coverage area, in order to be able to get the same synchronization as D2D UEs within network coverage. Such a synchronization providing device may be a D2D UE at a coverage edge of the network, within D2D communication range of the D2D UE lying outside the coverage area. A coverage-edge UE may transmit a synchronization signal that can be used by the out of coverage UE. However, for a coverage-edge UE to invariably transmit a synchronization signal can lead to unnecessary use of radio resources and unnecessary power consumption, because there may not be nearby D2D UEs which have no network coverage and which would therefore utilize the synchronization signal. A synchronization signal in such cases, therefore, would be superfluous but would nevertheless consume power of the transmitting UE and radio resources of the network as a whole. In addition, an out-of coverage D2D UE may move back to network coverage or be taken out of service, so that an in-network UE that can stop transmission of a synchronization signal will conserve power and radio resources.

In one or more embodiments of the invention, therefore, in-network and out-of network synchronization signal types are defined: a SYNC1 signal indicating synchronization with a network, transmitted by UEs in-network coverage, and a SYNC2 signal indicating a synchronization reference completely unrelated the network or related to network through a SYNC1 signal, transmitted by out-of-network coverage UEs. These signal types may comprise two different sequences or sets of sequences for example, or may differentiate in other ways for example different resources or different transmission periodicity.

Figure 1:
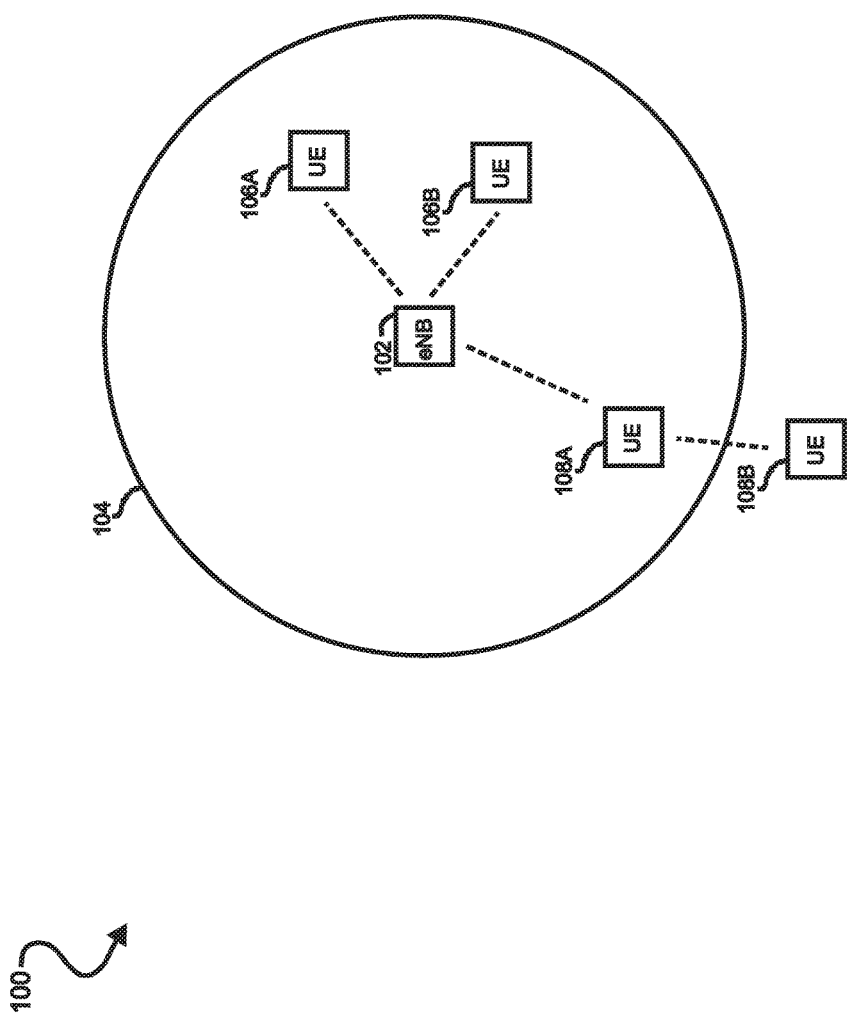
FIG. 1 illustrates a network employing an embodiment of the present invention.

FIG. 1 illustrates a system 100 of a network and UEs according to an embodiment of the present invention. The network comprises a base station implemented as an eNodeB (eNB) 102, whose coverage area defines a cell 104. The network supports UEs 106A and 106B, both of which are within network coverage; UEs 108A and 108B are near the cell edge, the UE 108A being within network coverage and the UE 108B being outside of the network coverage. In the presently illustrated example, both of the UEs 106A and 106B are within coverage of the eNB 102, but of the UEs 108A and 108B, only the UE 108A is within coverage of the eNB 102. Embodiments of the present invention provide mechanisms to allow the UE 108A (for example) to provide a synchronization signal to the UE 108B (for example), while managing signaling in such a way that UEs such as the UE 106A and 106B do not, when such synchronization is not needed perform signaling in an effort to provide or offer synchronization to out of coverage UEs.

One or more embodiments of the invention, therefore, define different kinds of synchronization signals usable for synchronization in D2D partial coverage and out of network coverage scenarios. A SYNC1 signal (transmitted by a UE within network coverage) is defined as indicating synchronization with direct reference to the network and a SYNC2 signal is defined as indicating a synchronization reference only indirectly related to the network through a SYNC1 signal or not related to the network at all. The SYNC1 and SYNC2 signals may comprise different sets of sequences.

In a case involving the UE 108B (as an example of an out-of-coverage UE), the UE 108B searches for SYNC signals. If a SYNC1 signal is detected, it synchronizes with the SYNC1 signal and begins to send a SYNC2 signal with a predefined timing offset relative to the timing of the detected SYNC1 signal. One purpose of transmitting SYNC2 signal is to let the SYNC1 transmitting UE to know that there is an out-of network-coverage UE that depends on it for synchronization. In some embodiments of the invention, another purpose of transmitting SYNC2 signal is to relay the synchronization to another out-of-network-coverage UE that cannot hear any SYNC1 signal. If only a SYNC2 signal is detected, the UE 108B will synchronize with the SYNC2 signal. In some embodiments it may also begin to send a SYNC2 signal with the same timing as that of the detected SYNC2 signal.

Synchronizing with SYNC2 signal is beneficial because in this way an out-of-network-coverage UE may become synchronized with a network although it does directly hear a SYNC1 signal. Synchronizing with a SYNC2 signal is also beneficial for forming synchronized out-of-network-coverage UE groups when none of the UEs in the group can hear the SYNC1 signal. By synchronizing with SYNC2 signals such a group may operate in a coordinated manner even without network coverage. If no SYNC1 or SYNC2 signal is detected, the UE 108B will send a SYNC2 signal autonomously, with its own timing relations.

In the case of an in-coverage UE, such as the UEs 106A and 106B, and 108A, a UE satisfying specified criteria or conditions will perform monitoring to determine whether any SYNC2 signals are detected. Such criteria or conditions may involve, for example, uplink (UL) SNR or other UL signal quality measurements, downlink (DL) SNR, DL reference signal receive power/reference signal receive quality (RSRP/RSRQ), timing advance, and other appropriate criteria that are related to the probability that a UE would need to provide synchronization reference to a UE without network coverage. In other words, meeting the criteria and conditions predict that the UE is close to the cell edge. If a SYNC2 signal is detected (as may occur, for example, if a out-of-network-coverage D2D UE not synchronized to the network is in its proximity), and only then, the in-network-coverage UE will begin to send a SYNC1 signal to aid an out-of-network-coverage UE in obtaining synchronization to the network timing.

A UE that has started to send a SYNC1 signal will continue to monitor whether a SYNC2 signal can be detected. If no such signal can be detected, the UE will cease transmission of the SYNC1 signal. Such procedures insure that SYNC1 signals will be sent only when they are possibly needed for synchronization of out-of-network-coverage UEs.

One implementation example may be that SYNC1 signals and SYNC2 signals can be selected from different sets of sequences. A SYNC2 signal may be chosen from a different set of sequences than those used by SYNC1 signals. The sequences used by SYNC1 and SYNC2 may be known to UEs both in and out of network coverage in a specified way.

In one simple implementation, only two sequences are specified, one for SYNC1 and another one for SYNC2 and these are used in all cells by all UEs. In another implementation, multiple SYNC1-SYNC2 sequence pairs and one SYNC2 signal without a matching SYNC1 pair are specified. The pairs could be allocated cell or UE specific manner, and the SYNC2 without a matching pair would be reserved to be used by UEs that do not have even indirect reference to the network synchronization. UE specific use of SYNC1 signals would eliminate some situations where two UEs ends up transmitting the common SYNC1 although only one of the UEs would be actually needed for synchronizing an out-of-network-coverage UE. The procedure described above and in greater detail in connection with FIG. 3, when applied with a single SYNC1-SYNC2 sequence pair shared by UEs, allows for such the case in which, due to UE mobility, the out-of-network coverage UE is unable to distinguish or indicate which SYNC1 transmitting UE it is synchronizing to. With the different paired SYNC1-SYNC2 assigned to in-network coverage UEs, after an out-of network coverage UE synchronizes to one in-coverage UE, it will send the paired SYNC2. Then upon detecting paired SYNC2 (if this SYNC2 matches with its own SYNC1), an in-network coverage UE can know if any out-of coverage UEs are relying on it. The paired SYNC1-SYNC2 may also be assigned with different resources so that sequences from different pairs will not interfere with each other.

Figure 2:
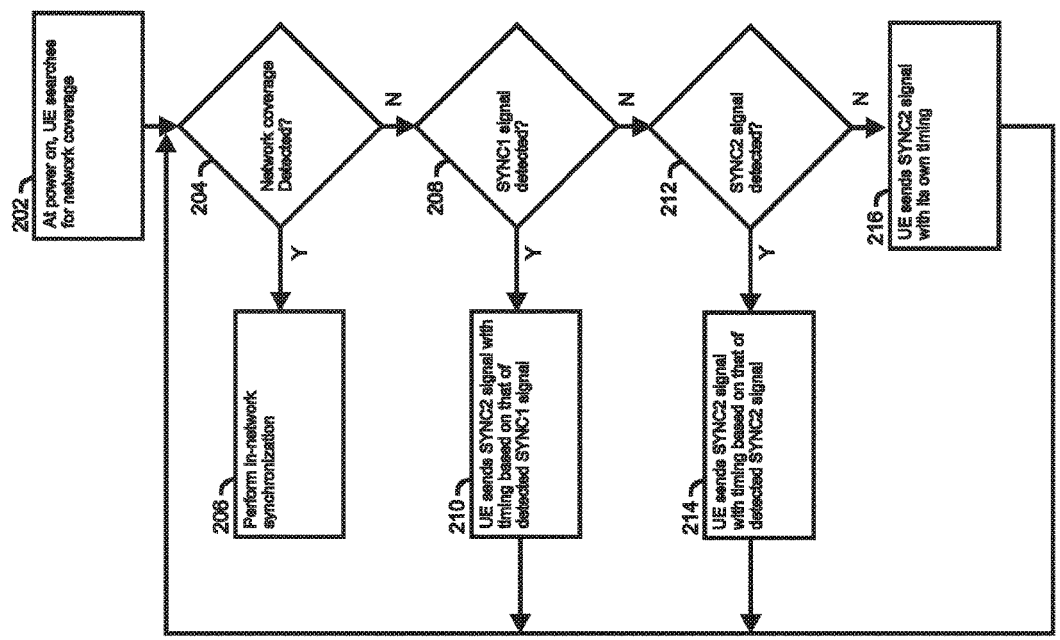
FIGS. 2 and 3 illustrate processes of synchronization according to embodiments of the present invention.

FIG. 2 illustrates a process 200 of synchronization according to an embodiment of the present invention, primarily illustrating details of actions undertaken by out of network coverage UEs.

At block 202, at power on of a UE, a UE searches for network coverage. The process proceeds to block 204, and the UE determines if network coverage has been detected. If network coverage is detected, the process proceeds to block 206 and the UE performs an in-coverage UE SYNC procedure.

If network coverage is not detected, the process proceeds to block 208, and the UE determines if a SYNC1 signal is detected. If yes, the process proceeds to block 210 and the UE sends a SYNC2 signal with timing based on the detected SYNC1 signal. The process then returns to block 204.

If no, the process proceeds to block 212 and the UE determines if a SYNC2 signal is detected. If a SYNC2 signal is detected, the process proceeds to block 214 and the UE sends a SYNC2 signal with timing based on the detected SYNC2 signal. The process then returns to block 204. Depending on the implementation, the searching for SYNC1 and SYNC2 can take place simultaneously.

If no, the process proceeds to block 216, and the UE sends a SYNC2 signal with its own timing. The process then returns to block 204.

Figure 3:
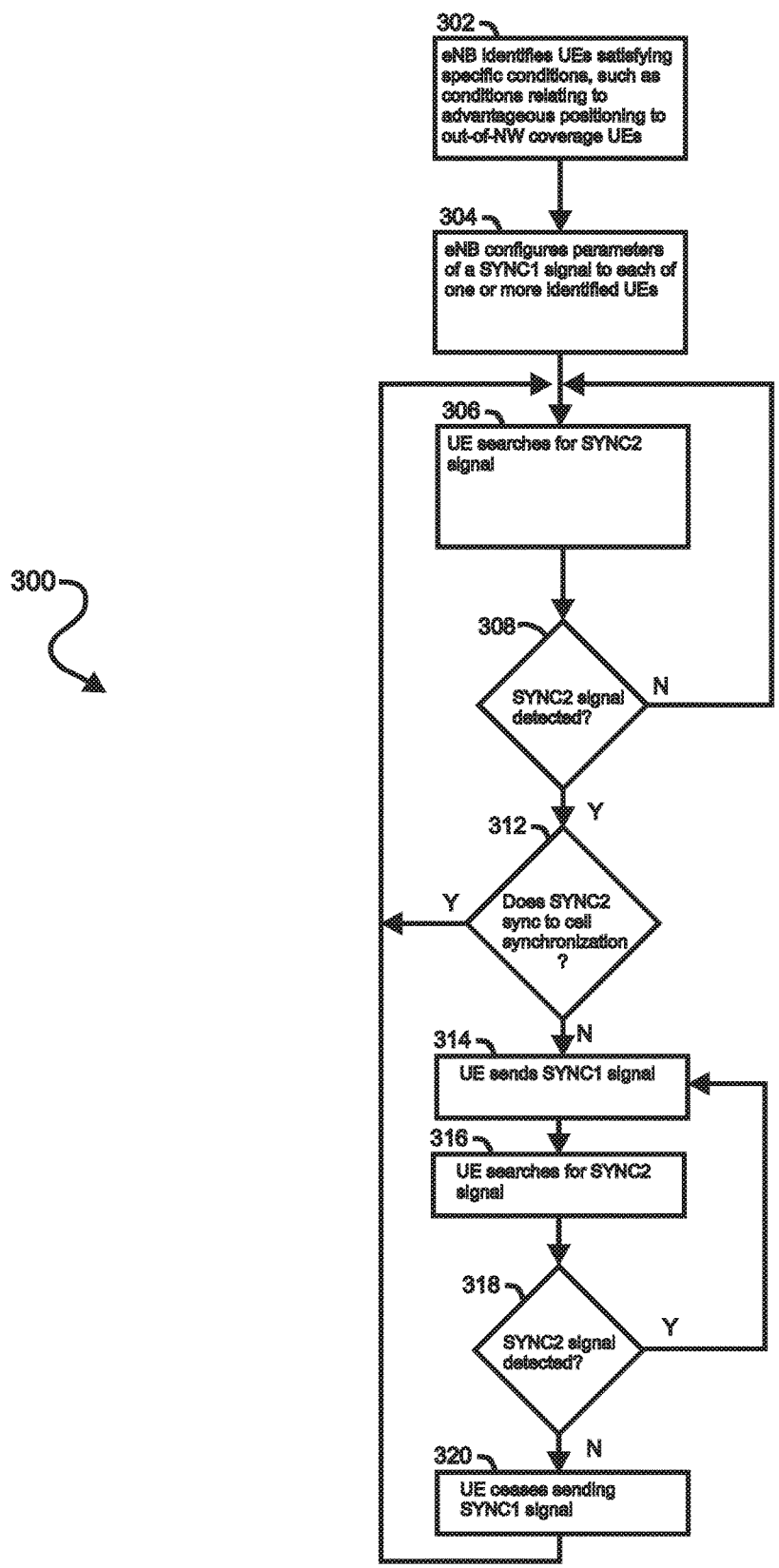

FIG. 3 illustrates a process 300 according to an embodiment of the present invention. The process 300 is directed to UEs selected by the eNB. Selection may be made, for example, on the basis that the UEs satisfy specified criteria and conditions for being a candidate for providing a synchronization signal. For connected mode UEs, fulfillment of such conditions and criteria by a UE can be analyzed by an eNB using uplink link status. The fulfillment of the conditions and criteria can also be analyzed based on a threshold broadcast by the eNB. For instance, if a measured downlink SNR or RSRP/RSRQ is below the threshold, the UE is considered to be on the coverage edge. The UE may have been configured to start SYNC2 signal search when it observes conditions fulfilled based on comparison with the threshold or it may in this situation send an indication to eNB and start search only after instructed by eNB to do so. Parameters of a SYNC1 signal may identify radio resources where the SYNC1 signal will be transmitted.

At block 302, therefore, an eNB identifies UEs satisfying specified conditions, such as conditions indicating location on a coverage edge or another location where the UE is likely to be advantageously positioned to serve an out-of network coverage UE. The conditions may be, for example, SNR or RSRP/RSRQ conditions such as those described above or based on UL signal strength or quality measurements or timing advance values. At block 304, the eNB configures parameters of a SYNC1 signal to one or more identified UEs. Parameters may include, for example, radio resource where SYNC1 is transmitted.

At block 306, a configured UE searches for a SYNC2 signal. At step 308, a determination is made as to whether the UE detects a SYNC2 signal. If no, the process branches back to block 306 so that the search continues, and if yes, the process proceeds to block 312. At block 312, the UE checks if the SYNC2 signal's timing corresponds to the cell's timing. If yes, the process branches back to block 306. If the timing does not correspond to cell's timing, process branches to block 314, and the UE transmits the SYNC1 signal. At block 316, the UE searches for a SYNC2 signal and at block 318 the UE determines if a SYNC2 signal is detected. If yes, the process branches back to block 314 and the UE continues to send the SYNC1 signal. The sending of the SYNC1 signal thus continues until, after searching for a SYNC2 signal at block 316 and determining at block 318 whether such a signal detected, a determination is made that a SYNC2 signal is not detected. The process then proceeds to block 320 and at block 320, the UE stops SYNC1 transmission and after that branches back to block 306, so that the UE again searches for a SYNC2 signal Embodiments of the present invention are directed to managing configuration and use of signals so that SYNC1 signals are sent by UEs only when needed. Further embodiments of the invention, however, may provide additional mechanisms for synchronization.

As described above, out-of coverage UE detecting a SYNC1 signal synchronizes to that signal and starts to transmit its SYNC2 signal. This SYNC2 signal can be a synchronization source to another out-of-coverage UE that, being for example further away from cell edge, does not hear any SYNC1 signals. In this way, an out-of-coverage UE can relay the synchronization to another UE. In one exemplary embodiment, such relaying is not undertaken; rather, an out-of-coverage UE synchronizing to a SYNC1 signal of an in-coverage UE indicates to in network coverage UEs that it is dependent on the SYNC1 signal, and does not itself transmit any sort of signal that could provide synchronization for another out-of coverage UE. The indication may be expressed, for example, by SYNC2 signals transmitted so infrequently that they cannot serve as a synchronization source but are nevertheless sufficient for indicating dependence on a SYNC1 signal. Such an approach conserves power (and therefore battery life) for the out-of-network coverage UE. However, such an approach might deny coverage to the UE receiving services, because an out-of-network coverage UE would not relay its synchronization to further outlying UEs.

The principle of avoiding unnecessary synchronization signal transmissions, fulfilled with the above presented embodiments for the in-coverage UEs, can be applied in a general case of stratified synchronization. In stratified synchronization the primary synchronization sources (eNBs in the embodiments above) provide synchronization to second tier (or rank) nodes (coverage edge in-network-coverage UEs in the embodiments above) that provide synchronization to third tier nodes (out-of-coverage UEs hearing SYNC1 in the embodiments above) and so on. In order to minimize transmissions of synchronization signals, nodes would follow the rule that a node on tier k starts providing a synchronization signal only when it observes a signal transmitted by a node on tier k+2 or higher because its synchronization signal may move the other node from tier k+2 to tier k+1. The presented embodiments apply this general principle in a limited form as an in-network coverage UE (node on tier 1) starts to transmit SYNC1 only when it observes an unsynchronized SYNC2 transmitting UE (node on tier infinity from the in-coverage UE's point of view).

Figure 4:
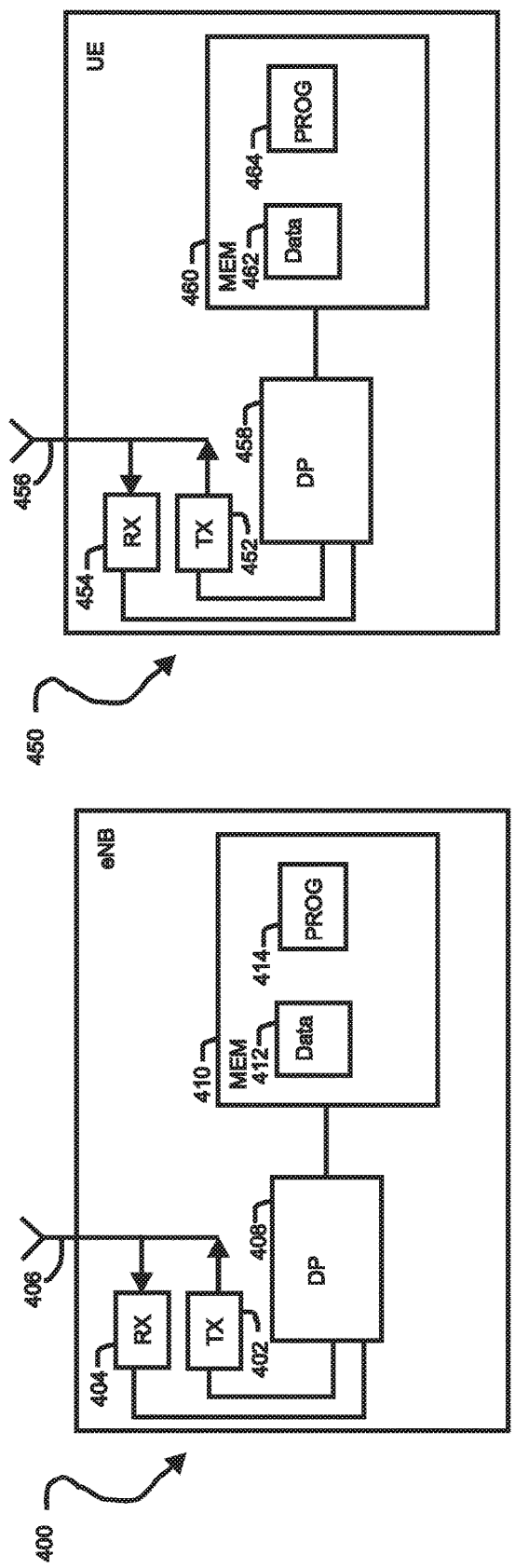
FIG. 4 illustrates elements that may be used in carrying out embodiments of the present invention.

FIG. 4 illustrates details of a base station, implemented as an eNB 400, and a mobile communications device, implemented as a UE 450. The eNB 400 may suitably comprise a transmitter 402, receiver 404, and antenna 406. The eNB 400 may also include a processor 408 and memory 410. The eNB 400 may employ data 412 and programs (PROGS) 414, residing in memory 410.

The UE 450 may suitably comprise a transmitter 452, receiver 454, and antenna 456. The UE 450 may also include a processor 458 and memory 460. The UE 450 may employ data 462 and programs (PROGS) 464, residing in memory 460.

At least one of the PROGs 414 in the eNB 400 is assumed to include a set of program instructions that, when executed by the associated DP 408, enable the device to operate in accordance with the exemplary embodiments of this invention, as detailed above. In these regards the exemplary embodiments of this invention may be implemented at least in part by computer software stored on the MEM 410, which is executable by the DP 408 of the eNB 400, or by hardware, or by a combination of tangibly stored software and hardware (and tangibly stored firmware). Similarly, at least one of the PROGs 464 in the UE 450 is assumed to include a set of program instructions that, when executed by the associated DP 458, enable the device to operate in accordance with the exemplary embodiments of this invention, as detailed above. In these regards the exemplary embodiments of this invention may be implemented at least in part by computer software stored on the MEM 460, which is executable by the DP 458 of the UE 450, or by hardware, or by a combination of tangibly stored software and hardware (and tangibly stored firmware). Electronic devices implementing these aspects of the invention need not be the entire devices as depicted at FIG. 1 or FIG. 4 or may be one or more components of same such as the above described tangibly stored software, hardware, firmware and DP, or a system on a chip SOC or an application specific integrated circuit ASIC.

In general, the various embodiments of the UE 450 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEM 410 and 460 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 408 and 458 include but are not limited to general purpose computers, special purpose computers, microprocessors, digital signal processors (DSPs) and multi-core processors.

Electronic devices implementing these aspects of the invention need not be the entire devices as depicted at FIG. 1 or FIG. 4 or may be one or more components of same such as the above described tangibly stored software, hardware, firmware and DP, or a system on a chip SOC or an application specific integrated circuit ASIC.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description. It will be further recognized that various blocks discussed above may be performed as steps, but the order in which they are presented is not limiting and they may be performed in any appropriate order with or without additional intervening blocks or steps.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description. It will be further recognized that the various blocks illustrated in FIGS. 2-5 and discussed above may be performed as steps, but the order in which they are presented is not limiting and they may be performed in any appropriate order with or without additional intervening blocks or steps.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

What is claimed is:

1. An apparatus comprising:
   at least one processor;
   memory storing computer program code;
   wherein the memory storing the computer program code is configured to, with the at least one processor, cause the apparatus to at least:
   determine whether or not a first user device associated with the apparatus is within coverage of a network; and
   if the first user device is within coverage of the network:
   determine if an out-of-coverage synchronization signal from an out-of-coverage user device is detected; and
   in response to detection of an out-of-coverage synchronization signal from an out-of-coverage user device, cause the first user device to transmit an in-coverage synchronization signal.

2. The apparatus of claim 1, wherein the first user device is caused to transmit an in-coverage synchronization signal only if the timing of the out-of-coverage synchronization signal does not correspond to timing of the network.

3. The apparatus of claim 1, wherein, once the first user device has begun to transmit an in-coverage synchronization signal, the first user device continually checks for the presence of an out-of-coverage synchronization signal and continues to transmit the in-coverage signal while an out-of-coverage synchronization signal is present.

4. The apparatus of claim 1, wherein the memory storing the computer program code is further configured to, with the at least one processor, cause the apparatus to: in response to failure to detect an out-of-coverage synchronization signal from an out-of-coverage user device, cause the first user device to refrain from transmitting an in-coverage synchronization signal.

5. The apparatus of claim 1, wherein the memory storing the computer program code is further configured to, with the at least one processor, cause the apparatus to, if the first user device is not within the coverage area of the network,
   upon detection of an in-coverage synchronization signal from an in-coverage user device, cause the first user device to use the in-coverage synchronization signal for synchronization and to transmit an out-of-coverage synchronization signal exhibiting timing based on the detected in-coverage synchronization signal.

6. The apparatus of claim 1, wherein the memory storing the computer program code is further configured to, with the at least one processor, cause the apparatus to, if the first user device is not within the coverage area of the network and fails to detect an in-coverage synchronization signal:
   upon detection of an out-of-coverage synchronization signal from an out-of-coverage user device, cause the first user device to use the out-of-coverage synchronization signal for synchronization and to transmit an out-of-coverage synchronization signal exhibiting timing based on the detected out-of-coverage synchronization signal.

7. The apparatus of claim 1, wherein the memory storing the computer program code is further configured to, with the at least one processor, cause the apparatus to, upon failure to detect any synchronization signal:
   cause the first user device to generate synchronization information and to transmit an out-of-coverage synchronization signal based on the generated synchronization information.

8. The apparatus of claim 1, wherein the first user device is configured to distinguish in-coverage and out-of-coverage synchronization signals based on sequence information exhibited by the in-coverage and out-of-coverage synchronization signals.

9. The apparatus of claim 1, wherein the memory storing the computer program code is further configured to, with the at least one processor, cause the apparatus to cause the first user device to continually determine whether an out-of-coverage synchronization signal is detected, and, if no such signal is detected, cease transmission of the in-coverage synchronization signal.

10. The apparatus of claim 9, wherein determining whether the first user device is to search for out-of-coverage synchronization signals is performed based at least on part on a relation of detected signal characteristics to a specified threshold.

11. A method comprising:
   determining whether or not a first user device is within coverage of a network; and
   if the first user device is within coverage of the network:
   determining if an out-of-coverage synchronization signal from an out-of-coverage user device is detected; and
   in response to detection of an out-of-coverage synchronization signal from an out-of-coverage user device, causing the first user device to transmit an in-coverage synchronization signal.

12. The method of claim 11, further comprising, if the first user device is not within the coverage area of the network:
   upon detection of an in-coverage synchronization signal from an in-coverage user device, causing the first user device to use the in-coverage synchronization signal for synchronization and to transmit an out-of-coverage synchronization signal exhibiting timing based on the detected in-coverage synchronization signal.

13. The method of claim 11, further comprising, if the first user device is not within the coverage area of the network and fails to detect an in-coverage synchronization signal:
   upon detection of an out-of-coverage synchronization signal from an out-of-coverage user device, causing the first user device to use the out-of-coverage synchronization signal for synchronization and to transmit an out-of-coverage synchronization signal exhibiting timing based on the detected out-of-coverage synchronization signal.

* * * * *